Nov. 13, 1962                    D. E. YADON                    3,063,512
                    PANTOGRAPH DRIVE AND STEERING ASSEMBLY
Filed Sept. 19, 1960                                        4 Sheets-Sheet 1

INVENTOR.
Donald E. Yadon
BY
ATTORNEYS

Nov. 13, 1962     D. E. YADON     3,063,512
PANTOGRAPH DRIVE AND STEERING ASSEMBLY
Filed Sept. 19, 1960     4 Sheets-Sheet 2
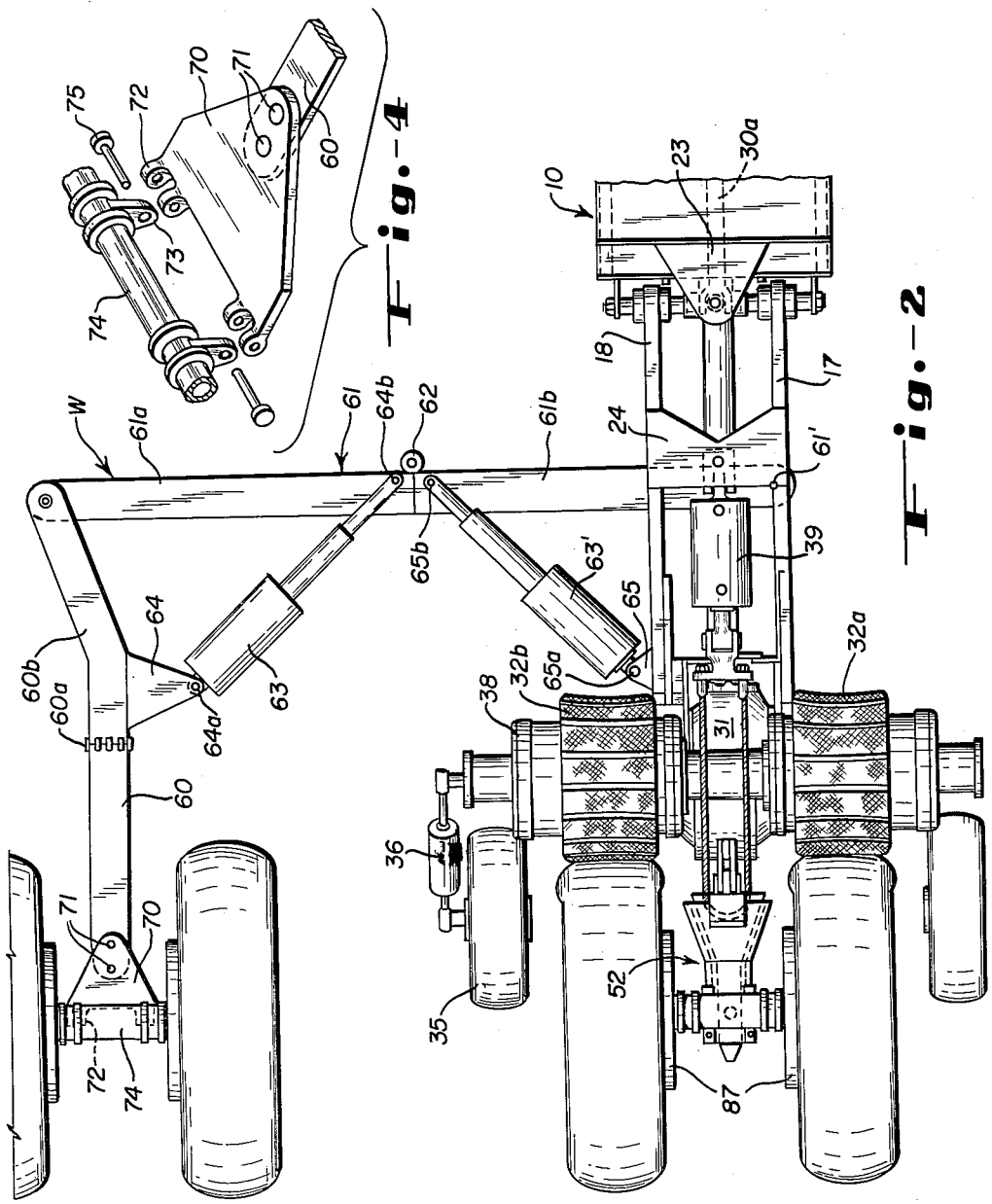
INVENTOR.
Donald E. Yadon
BY
ATTORNEYS

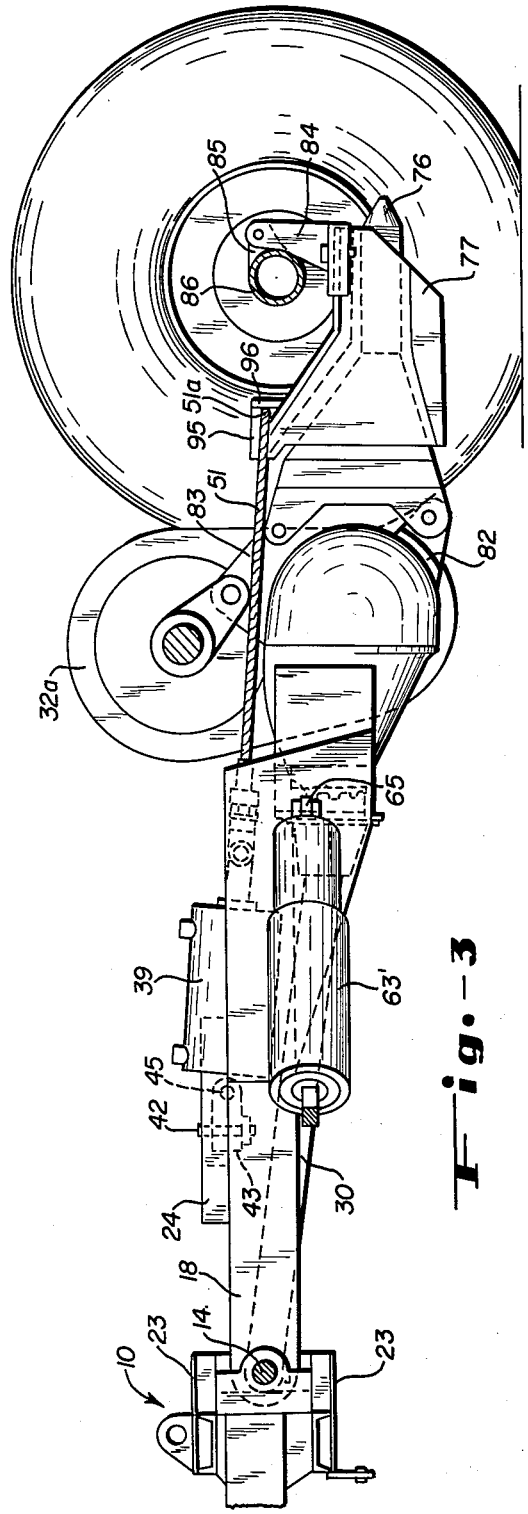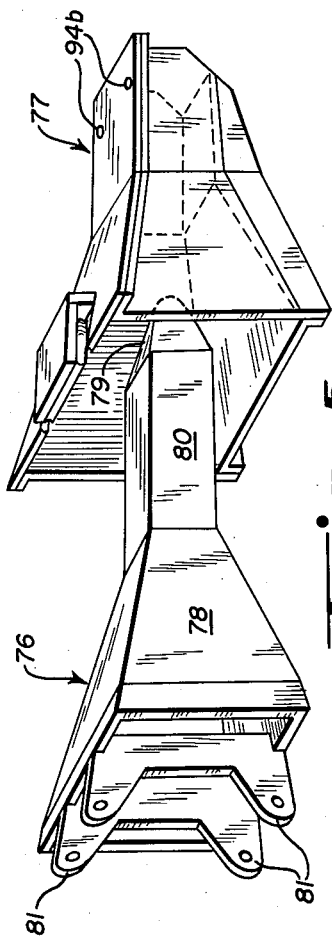

Nov. 13, 1962     D. E. YADON     3,063,512
PANTOGRAPH DRIVE AND STEERING ASSEMBLY
Filed Sept. 19, 1960     4 Sheets-Sheet 4

INVENTOR.
Donald E. Yadon
BY
ATTORNEYS

United States Patent Office 3,063,512
Patented Nov. 13, 1962

3,063,512
PANTOGRAPH DRIVE AND STEERING ASSEMBLY
Donald E. Yadon, Littleton, Colo., assignor to American Coleman Company, Littleton, Colo., a corporation of Nebraska
Filed Sept. 19, 1960, Ser. No. 56,791
7 Claims. (Cl. 180—14)

This invention relates to apparatus for providing ground movement of aircraft, and more particularly it relates to a power transmission assembly for applying motivating power to the ground supported wheels of an airplane.

This invention is directed to improvements in pantograph drive assemblies of the type disclosed in co-pending application Serial No. 796,602, filed March 2, 1959, for Aircraft Tug.

With the development of aircraft, both military and commercial, ever increasing sizes and weights of aircraft appear with each major advance. This is particularly true of the developments in jet-type aircraft, wherein the weights of newer aircraft far exceed those of a few years ago. For example, a B–52 may approach 500,000 pounds dead weight and others may exceed 600,000 pounds. With the increasing size and weight of such aircraft, ground movement particularly in and around buildings, hangars, etc. has become an increasing problem.

Aircraft tugs of the type disclosed in co-pending application Serial No. 796,602 provide efficient means for providing motivating power for an aircraft under poor traction conditions by applying the power directly to the aircraft wheels, resulting in a prime mover of considerably less in weight than the conventional tractor which only pulls or pushes. To obtain traction for pulling an aircraft, such as a B–52, the tractor would, under some conditions, require about one-half the weight of the aircraft. The concepts of the aircraft tug of the above application embody the use of the weight of the aircraft itself to provide the needed traction for ground movement. It also provides a pantograph steering assembly wherein power and steering are applied to the aircraft from the prime mover.

This invention provides simplified and improved pantograph type drive and steering assembly adapted for a straight line driving connection with an aircraft landing gear and having an outrigger guide and steering assembly extending from the straight line connection for releasable interlocking engagement with a portion of the aircraft spaced from the driven gear. This invention provides a simpler and lighter construction in that but one driving interconnection between the prime mover and the aircraft is necessary. Furthermore, by novel apparatus assembly, the device is adapted to be collapsed into a compact package when not in use. Novel complementary centering means are used to simplify interconnection of the assembly with the aircraft. The apparatus includes means to assure a proper driving relationship between the straight line driving connection and the aircraft wheel which overcomes the tendency of prior arrangements to unnecessarily wear and weaken tire casings.

Briefly, apparatus embodying my inventive concepts comprises essentially a prime mover having a power source which is arranged for interconnection with a pantograph type driving and steering assembly. The pantograph assembly includes a first portion which is adapted for straight line driving engagement with an aircraft wheel. The interconnecting means provides novel centering means for fast and positive connection to an aircraft gear. Another side, arranged to operate parallel to the first portion form in general a pantograph assembly, is arranged with selectively actuated hydraulic telescoping steering cylinders for guiding an attached aircraft. The centering, and the control of the steering cylinders, as well as an endless track aircraft wheel driving assembly are all powered by the single power source of the prime mover.

Further details of construction will become obvious from a study of the hereafter set forth drawings description.

It is thus among the objects and advantages of my invention to provide a rugged, simple and easily operated prime mover assembly for the ground movement of an aircraft in which motivating power is supplied directly to a single aircraft wheel assembly; which is rapidly and easily centered in position with respect to the wheel to be driven; and which is adapted to drive the wheel without wear and deterioration of the aircraft tire casing.

It is a further object of my invention to provide a novel pantograph type driving and steering device adapted for straight line engagement with an aircraft wheel and having an outrigger guide and steering assembly adapted to be interconnected with a spaced portion of the aircraft, the entire assembly of which, is easily collapsible to a compact configuration when not in use.

It is another object of the invention to provide a pantograph prime mover assembly for the movement of ground supported aircraft through complicated maneuvers and turns of minimum radius; which is arranged to apply power directly to an aircraft wheel without the modification of aircraft; and which is arranged to be easily and simply attached to and disengaged from the normal towing lugs of an aircraft without special tools, skill or the like.

It is still a further specific object of my invention to provide a pantograph drive and steering assembly which is adapted for steering movement of a ground supported aircraft and in which all motivated portions of the assembly are powered by a single power source.

Other features and advantages of my invention will become obvious to those skilled in the art from a study of the following description of the appended drawings. In these drawings:

FIG. 2 is a top elevation of the apparatus of FIG. 1 interconnected with an aircraft for operation;

FIG. 3 is a side elevation in partial section of a portion of the apparatus of FIGS. 1 and 2;

FIG. 4 is an enlarged isometric detail of an aircraft interconnection of one of the parallel side members of the pantograph assembly;

FIG. 5 is an enlarged isometric detail of a portion of the centering elements of the device of FIG. 1;

Figure 1:
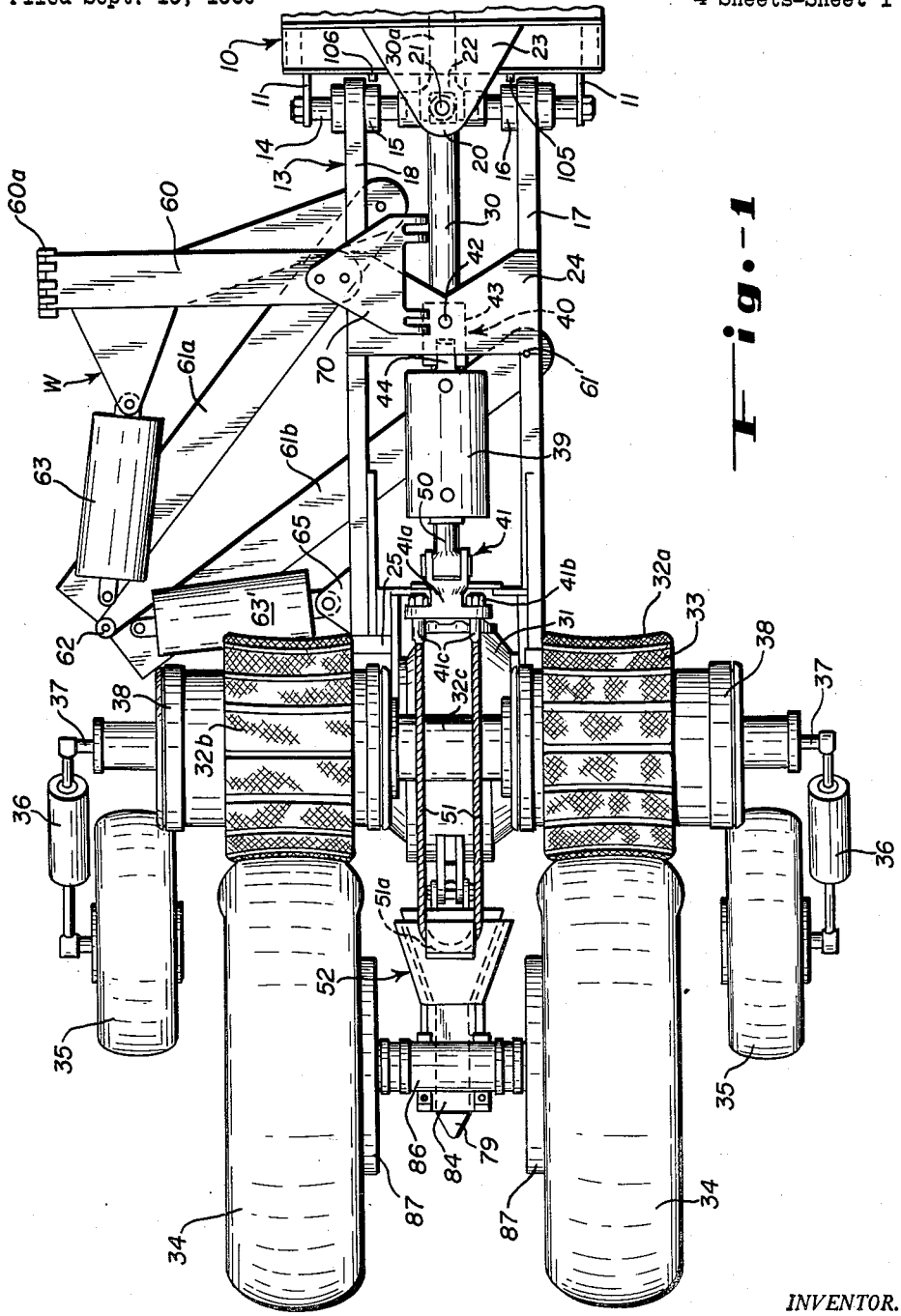
FIG. 1 is a partially schematic top elevational view of apparatus embodying my inventive concepts partially collapsed and partially interconnected with an aircraft to be moved.

Before describing the drawings in detail, I wish it understood that I do not desire to be limited thereby, but rather that the spirit and scope of my invention be defined in the appended claims.

The apparatus illustrated is designed to be interconnected with a prime mover, tractor or tow mechanism, such as is described in detail in the above-mentioned co-pending application. Such a tractor is designed with a low maximum height for movement under aircraft to be towed. Of course, it is to be understood that the tractor may be designed to meet various other conditions of service as to size and design.

One of the essential conditions, though, is that the tractor engine have sufficient power to provide the motivating power necessary to move the aircraft. A suitable tractor is designed to maneuver and steer the towed aircraft through its minimum radius turning movements, into and out of hangars, around parking ramps, and through related complicated turning maneuvers.

A rear portion of the tractor is indicated by reference character 10 in the drawings. A pair of opposed and spaced lugs 11 depend from the tractor end portion 10. In a simple form this interconnection is provided by journalling parallel frame members 17 and 18 in sliding journals 15 and 16, respectively. These journals are reciprocably mounted on stub shafts 14 secured at their outer ends in lugs 11 and at their inner ends in bracket 22. The frame members 17 and 18 are free to pivot in a vertical plane in the journals, and the journals are slidable along the shafts 14. The bracket 22 is supported by upper and lower support plates 23 held in position by pin 21 extending through rounded end portion 20. The parallel frame members 17 and 18 are interconnected intermediate their ends by the cross support 24 and at their forward end by the forward frame member 25.

A propeller shaft 30 in the drive assembly is interconnected with a propeller shaft 30a driven from the tractor by a universal connection (not completely shown) passing through bracket 22. The propeller shaft is interconnected with a differential 31 for driving tracks 32a and 32b. The differential is mounted on the frame between the parallel side members 17 and 18 adjacent the forward end thereof. Each of these endless track systems 32a and 32b is comprised of a series of tread elements 33 which are preferably scored for good driving contact between them and the aircraft wheels. The systems are supported at their respective upper portion by shaft 32c. When the track is not in driving relation with an aircraft tire, landing wheels 35 (FIG. 7) of the pantograph assembly are moved to a down position by means such as fluid pressure cylinders 36. The fluid pressure cylinders are suitably journalled on the stub shaft extension 37 of the hub 38 of the endless track systems.

A hydraulic cylinder 39, mounted between the frame members 17 and 18, is interconnected at end 44 with a bracket 40 on the cross member 24 at one end and with a yoke 41 at the opposite end. The yoke 41 is mounted on draw bracket 41a, to which is connected by its ends in metal threaded sheaths 41c a cable 51. The sheaths 41c are releasably held by nuts 41b. The bracket 40 is comprised essentially of a vertical pin 42 holding a bifurcated support 43 which is adapted to receive a boss or lug 44 on the hydraulic cylinder 39. A pin 45 (see FIG. 3) secures the cylinder to the bracket. The piston rod 50 of the hydraulic cylinder 39, which is interconnected through the pivotal connection 41, is adapted upon actuation to apply tension to the cable 51. In this manner a loop 51a is formed in the cable. This loop is suitably interconnected with a cleat 95 mounted on complementary portions of a centering apparatus, shown in general by numeral 52, as will be described in detail hereafter.

In FIG. 1, collapsible outrigger assembly W is shown in its collapsed configuration, carried by the parallel frame members 17, and pivotal in a horizontal plane about pin 61'. In FIG. 2, the outrigger assembly W is shown in its extended position forming, when joined to an aircraft, a general pantograph arrangement. The side member, which includes links 60 and 60b interconnected at hinge 60a when in its operative configuration, is parallel to the first side portion 13 (composed of the members 17 and 18) thus serving as the other parallel side member of the general pantograph assembly. The end member 61 is comprised of a pair of link members 61a and 61b hingedly interconnected at hinge 62 for pivotal movement in a horizontal plane.

A pair of telescoping steering cylinders 63 and 63' interconnect the end and side to the frame members 17 and 18. These cylinders provide collapsing and extending force to the members as well as steering force. Cylinder 63 is interconnected between support flange 64 on 60b by a pin 64a at one end and at the other end to an end of 61a by a pin 64b. The other cylinder 63' is interconnected to a flange 65 mounted on one end of frame member 18 by a pin 65a and at the other end to the end link 61b by a pin 65b.

The parallel side member 60 is releasably, fixedly interconnectable with a portion of the aircraft spaced from the straight line driving interconnection of the first side portion 13. Preferably, it is interconnected with the strut of an adjacent landing gear, spaced from the driven gear.

FIG. 4 is illustrative of such a preferred interconnecting arrangement for the member 60. A generally triangularly shaped plate 70 (FIG. 4) is fixed at its apex to the outboard end of the side member 60 as by a pair of rivets 71. The opposite end of the plate 70 has spaced pairs of ears 72. Each of these pairs of ears has an opening therein which is complementary to aircraft towing lugs 73 on the strut 74. When the outrigger assembly is moved into aircraft towing position (as in FIG. 2), the ears 72 will be releasably interconnected to the lugs 73 by such as pins 75. Such an arrangement is, obviously, easily redesigned to mate with other types of towing lugs.

The centering assembly at the end of the first side portion 13 is comprised essentially of a cone-wedge 76 and a complementary housing 77 (FIGS. 3 and 5). The cone-wedge is comprised of a truncated cone 78, an end cone 79 and in interconnecting portion 80 of uniform width and height. Preferably, the wedge is tubular or hollow in the interests of maintaining as low a weight factor as possible. The truncated cone portion 78 has two attached, spaced pairs of lugs 81 for static interconnection with lugs such as 82 and 83 carried on the pantograph assembly.

Figure 6:
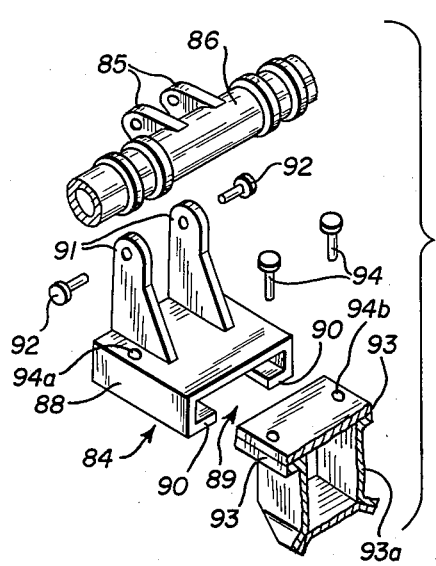
FIG. 6 is an enlarged fragmentary exploded isometric detail of the apparatus for interconnection of the driving side of the pantograph assembly.

The cone housing 77 is adapted to receive the cone-wedge 76 in a centering and wedging relation. The housing is further adapted to be releasably fixedly secured to an aircraft strut, and for one such strut an adapter assembly 84 provides an attachment. This assembly is arranged for quick and easy attachment to aircraft lugs 85 of gear strut 86 extending between the wheel hubs 87 (FIG. 1). The adapter body portion 88 (FIG. 6) has an open, channel bottom 89 and a pair of inwardly extending flanges 90. Extending normal to the upper surface of the planar body 88 are a pair of spaced lugs 91. These lugs 91 are adapted to be secured to the aircraft towing lugs 85 by means such as pins 92. The upper surface of the cone housing 77 has a pair of extending flange portions 93 adapted for complementary sliding relation on the ledges 90. The central portion 93a of the housing passes freely through the channel 89. The planar body 88, the ledges 90 and the extending portions 93, have complementary openings 94a adapted to receive pins 94 to thereby lock in a fixed and static position in the housing 77 by holes 94b in the adapter.

The end of the upper surface of the housing 77, opposite its point of interconnection with the adapter 84, carries a cleat 95 (FIGS. 3 and 5). The loop 51a of the cable 51 passes around the cleat and is maintained therein by the closure plate 96. The closure plate may be releasably affixed to the surface 93, or it may be integrally interconnected as by welding, in which case an end of the cable would be threaded through the opening between the cleat 95 and the closure plate 96.

Figure 7:
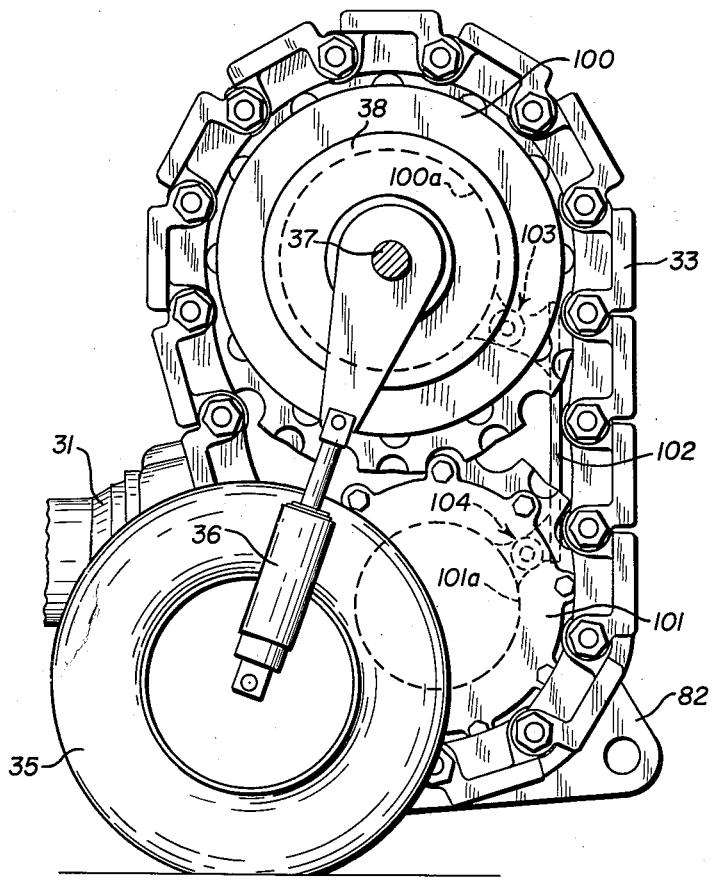
FIG. 7 is an enlarged detail side elevation of a portion of the apparatus of FIG. 1.

Each of the endless drive systems, such as 32b in FIG. 7, is driven by a sprocket 101, interconnected with the differential, around sprocket 100. The track elements 33 when in contact with the aircraft wheels 34 are preferably maintained in flat or straight line relation at the area of contact with the aircraft wheels. This straight line configuration is maintained by a plate 102 behind the track and which is maintained in position by its interconnection between sprocket hubs 100a and 101a. The plate 102 and the respective hubs 100a and 101a carry suitable complementary lug arrangements generally indicated by reference characters 103 and 104 for the interconnection. With this straight line, generally vertical configuration of track elements 33, the aircraft wheels are deformed in much the same manner as they are at the area of ground contact. This assures that the wheel is driven along by the tracks 33 without slippage and undesired, abnormal deformation of the tire casing which tends to deteriorate them.

All of the various hydraulic cylinders are preferably interconnected with and controlled by a single power source mounted on the tractor. However, the hydraulic lines and the power source are not shown in the drawings. Such lines, hydraulic pumps and valves are commonly known and used. The cylinders are preferably two-way action cylinders.

A pair of triggers 105 and 106 is mounted on the rear portion 10 of the tractor and positioned for bumping association with the journals 15 and 16 of the parallel frame members 17 and 18. These triggers are interconnected with a slide valve for supplying fluid to the hydraulic steering cylinders 63 and 63′, as described in the above copending application. Also, an override off and on valve (not shown) should be included in the system to prevent steering action during the time when the device is being hitched to the aircraft for towing. When the frame members 17 and 18 are not in direct line driving engagement with the wheels 34, either trigger will be depressed, thereby providing power to the steering cylinders, as shall be detailed hereinafter.

In operation, therefore, when it is desired to move an aircraft using my driving and steering assembly, the adapter 84 is suitably interconnected with aircraft lugs 85. Next, the assembly is backed toward the strut upon which the adapter is mounted until the cone housing 77 moves into engagment with and is connected to the adapter. The drive unit of the tractor is then disengaged. In this stage of connection, the cable 51 is relatively loose and the cone-wedge 76 is loosely encompassed by the housing 77. The hydraulic cylinder 39 is then actuated to draw the slack from cable 51 and pull the endless tracks 32a and 32b toward a driving relation with the wheels 34. As the cone 76 is pulled into the housing 77, it centers the unit, any lateral movement being taken up by the frames 17 and 18 sliding on pins 14. The cable is pulled taut and the pulling continued until the endless tracks 32a and 32b are properly positioned in driving relation snubbed onto the aircraft wheels.

The outrigger assembly W is then moved from the collapsed configuration of FIG. 1 to the extended configuration of FIG. 2. The plate 70 is moved into locking engagement with the lugs 73 and the pins 75 complete the attachment.

After the unit is in towing relation and on starting the towing operation, any off center positioning of the draw bar of the tug assembly will cause actuation of the triggers 105 and 106 actuating the steering cylinders 63 and 63′. This is readily compensated by steering the towing vehicle. The override lock out valve, however, prevents such actuation until the vehicle moves thus preventing damage which might occur if the steering cylinders were actuated without the aircraft and towing vehicle moving.

The landing wheels 35 may then be drawn to their up position by suitable actuation of the hydraulic cylinders 36. With the foregoing completed, power may then be transmitted from the tractor propeller shaft 30a through the propeller shaft 30 to the transmission 31. The transmission will then drive the endless tracks 32a and 32b and the aircraft moved as desired.

In my preferred arrangement a unitary control panel will be mounted on the rear portion of the tractor 10 or on some portion of the pantograph assembly which will provide easy access and control for the valves of all of the various hydraulic cylinders, transmission, etc.

Steering is provided by the triggers 106 and 105 being actuated by the draw bar sliding on the pins 14. When the tug is turned, the draw bar moves in relation to the pins tripping the triggers and actuating the steering cylinders. In FIG. 2, on turning the tug left, the draw bar is moved actuating cylinder 63 to draw it up and releasing cylinder 63′ to lengthen it, thus distorting the pantograph to the left turning the aircraft wheels so that it follows the tug. The same happens on a turn to the right with the cylinders operating in reverse manner. Thus the steering cylinders distort the squareness of the pantograph to cause turning of the aircraft wheel for steering. Note during towing, the tug or towing vehicle free wheels, i.e. no power is applied to its wheels. In effect the aircraft pushes the tug, which provides the power for driving the aircraft wheels.

When it is desired to disconnect my driving and steering assembly from the aircraft, the steering cylinders 63 and 63′ are first shut off. Next, the pins 75 are removed to allow release of the plate 70 and the arm 60. The arm 60 may then be pivoted around the hinge 60a and the structural unit 61a pivoted around the hinge 62 toward the first side portion 13. Commensurate with the movement of the structural unit 61a, the structural unit 61b is pivoted about the pin 61′. The foregoing is continued until such time as the collapsed or folded configuration shown in FIG. 1 is reached.

The hydraulic cylinder 39 is actuated to slacken the cable 51 to thereby relieve the wedging relationship of the centering means. The wheels 35 are, of course, moved to a ground supported position. The pins 94 may be removed and the cone housing 77 removed from the channel 89. Removal of the pins 92 will thereafter allow removal of the adapter 84 from the lugs 85.

It is anticipated that many variations may be made and still be within the spirit and scope of my inventive concepts, such as for example, the particular hinging arrangement for the outrigger and its interconnection with steering means; the design of the centering assembly; the means of attachment to the aircraft; and many related structural and elemental changes.

Having thus described my invention with such particularity as to allow those skilled in the art to practice it, what I desire to have protected by Letters Patent is set forth in the following claims.

I claim:

1. A prime mover for ground movement of wheeled aircraft, comprising a frame assembly arranged for interconnection with side by side steerable aircraft wheel assemblies and cooperatively forming therewith a pantograph frame assembly, including two essentially parallel sides, each extending forwardly from a said wheel assembly, an endless track assembly mounted on and adjacent one end of a first of said sides, the adjacent end of the second side being arranged for temporary interconnection with one of the wheel assemblies, drive means carried by said frame assembly and including power transmission means for driving said endless track assembly, guide means arranged for releasable connection to the other said wheel assembly, coupling means mounted on said frame assembly adjacent said endless track assembly for operable connection with said guide means, power actuated means interconnecting said frame assembly and the aircraft for centering said frame assembly with said wheel assembly and snubbing said track assembly in driving engagement against the adjacent aircraft wheel and in a position above the ground, and means interconnected between the sides and said frame assembly for steering movement thereof.

2. A prime mover for ground movement of wheeled aircraft, comprising a frame assembly arranged for interconnection with a steerable aircraft wheel assembly and a spaced portion of an aircraft, and cooperatively forming therewith a pantograph frame assembly including two essentially parallel sides, each extending forwardly from the steerable wheel assembly and the adjacent portion of the aircraft to which they are respectively interconnected, and an endless drive assembly mounted on and adjacent the forward end of the side adjacent the steerable wheel assembly, the end of the other side including means arranged for temporary interconnection with said spaced portion of the aircraft, drive means carried by said frame assembly and extending along the side carrying the endless drive assembly, power transmission means interconnected between the endless drive assembly and the drive shaft, guide means arranged for releasable connection to said wheel assembly, coupling means mounted on said frame assembly adjacent said endless drive assembly arranged for operable connection with said guide means, power actuated means interconnecting said frame assembly and said guide means for centering said frame assembly with said wheel assembly and snubbing said endless drive assembly in driving engagement against the aircraft wheel in a position above the ground, and means interconnected between the side of said pantograph assembly for steering movements thereof.

3. A prime mover for ground movement of wheeled aircraft, comprising a frame assembly arranged for interconnection with side by side steerable aircraft wheel assemblies and cooperatively forming therewith a pantograph frame assembly, including two essentially parallel sides, each extending forwardly from a said wheel assembly, an endless track assembly mounted on and adjacent one end of a first of said sides, the adjacent end of the second side being arranged for temporary interconnection with one of the wheel assemblies, drive means carried by said frame assembly and including power transmission means for driving said endless track assembly, guide means arranged for releasable connection to the other said wheel assembly, coupling means mounted on said frame assembly adjacent said endless track assembly for operable connection with said guide means, power actuated means interconnecting said frame assembly and the aircraft for centering said frame assembly with said wheel assembly and snubbing said track assembly in driving engagement against the adjacent aircraft wheel and in a position above the ground, and expandable and contractable links interconnected between the sides of the frame assembly for steering distortion thereof.

4. A prime mover for ground movement of wheeled aircraft, comprising a frame assembly arranged for interconnection with side by side steerable aircraft wheel assemblies and cooperatively forming therewith a pantograph frame assembly including two essentially parallel sides, each side extending forwardly from a said wheel assembly, and an endless track assembly mounted on and adjacent one end of a first of said sides, the adjacent end of the other said side being arranged for temporary interconnection with one of the wheel assemblies, a drive shaft carried by the first side, power transmission means connected between the track assembly and the drive shaft for transmitting drive from said drive shaft means to said track assembly, guide means arranged for a releasable connection to the other wheel assembly, coupling means mounted on said frame assembly adjacent said endless track assembly for operable interconnection with said guide means, power actuated means interconnecting said frame assembly and said guide means for centering said frame assembly with said aircraft wheel assemblies and snubbing said endless track assembly with the adjacent aircraft wheel in a position above the ground, means interconnected between the sides of said frame for steering movement thereof, and means carried by said endless track assembly arranged to maintain the stretches thereof in snubbed engagement with said adjacent aircraft wheel in a substantially flat configuration.

5. The prime mover of claim 4 in which the power actuated means is a flexible cable interconnected at one end to the guide means and to a hydraulic motor at the other and looped over a portion of the guide means and arranged to selectively draw the frame means in centering relation to said guide means.

6. The prime mover of claim 4 in which the coupling means is a generally conically shaped plug and the guide means is a generally conical hollow member arranged for telescopic reception of said plug under influence of the power actuated means.

7. A prime mover according to claim 4 in which said other of said sides is interconnected with the side carrying the endless track assembly as an outrigger guide assembly arranged for selective collapsing against the said side carrying the endless track assembly.

References Cited in the file of this patent
UNITED STATES PATENTS

| | | |
|---|---|---|
| 2,133,065 | Weber | Oct. 11, 1938 |
| 2,409,552 | Donnellan | Oct. 15, 1946 |
| 2,966,222 | Lambert | Dec. 27, 1960 |
| 2,987,133 | Clifton | June 6, 1961 |